Dec. 22, 1959  J. E. JENKINS  2,917,918
VIBRATION MEASURING AND RECORDING APPARATUS
Filed Oct. 3, 1956  6 Sheets-Sheet 3
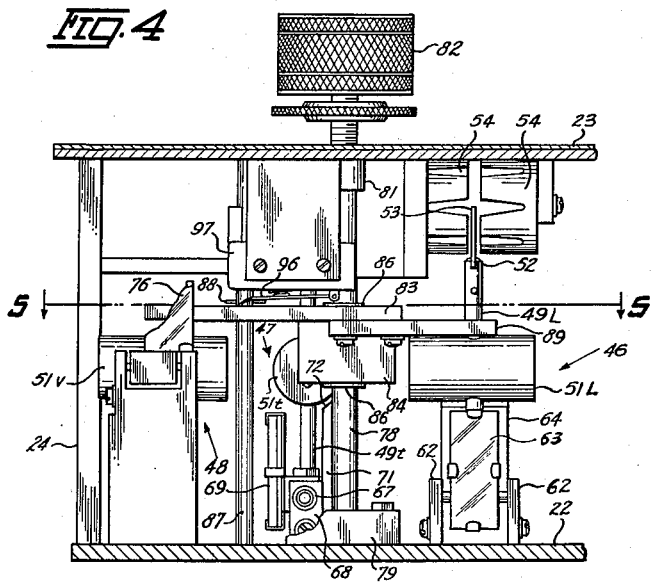
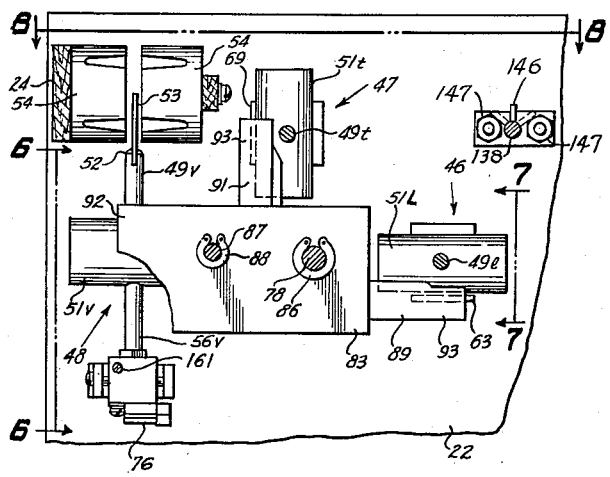
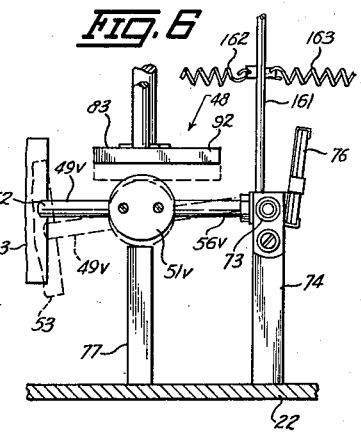
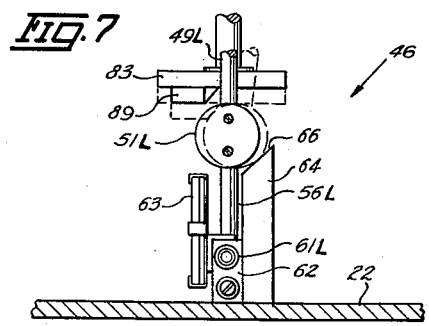
INVENTOR.
JULES E. JENKINS
BY
Rudolph L. Lowell
ATTORNEY.

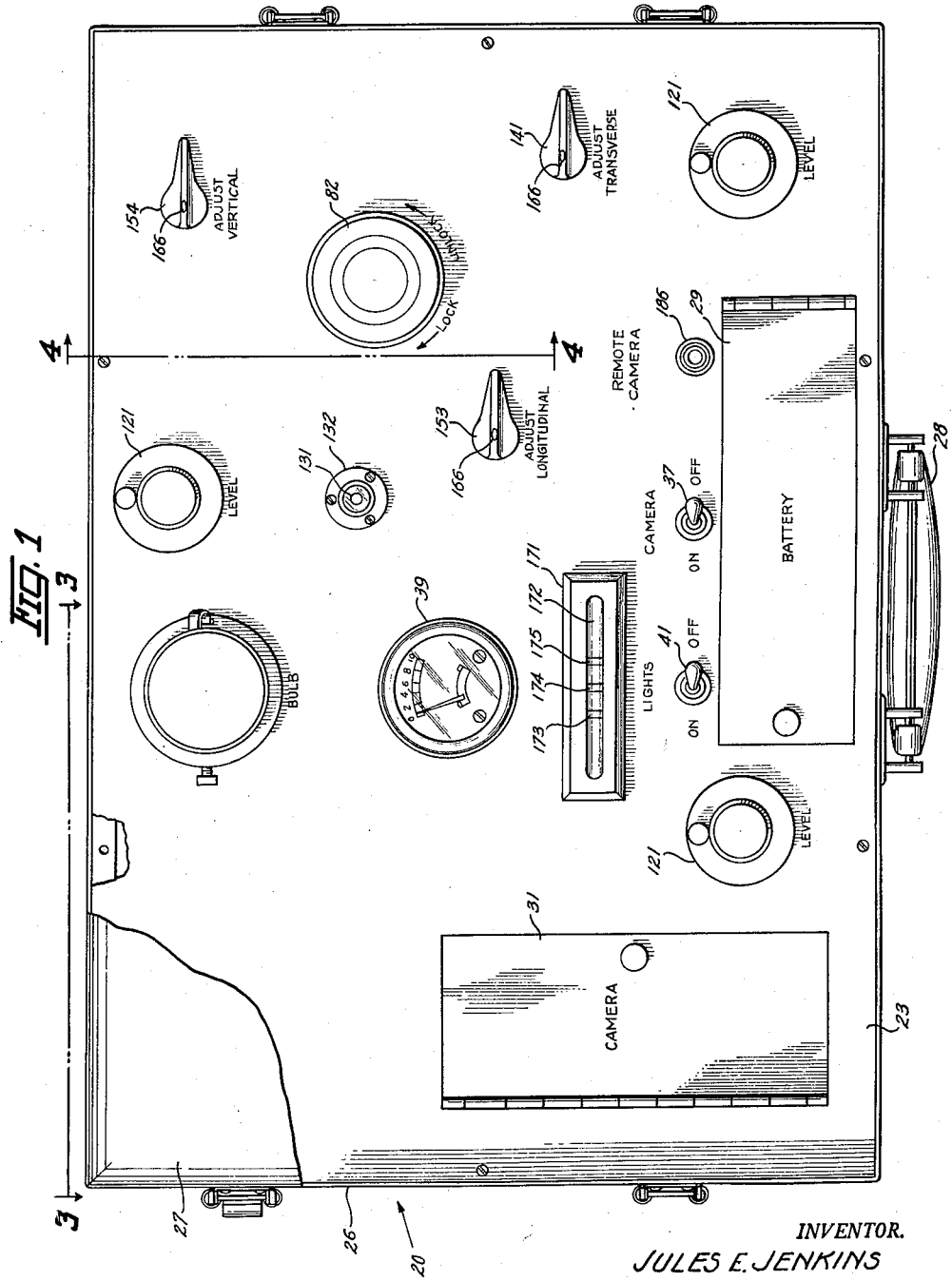

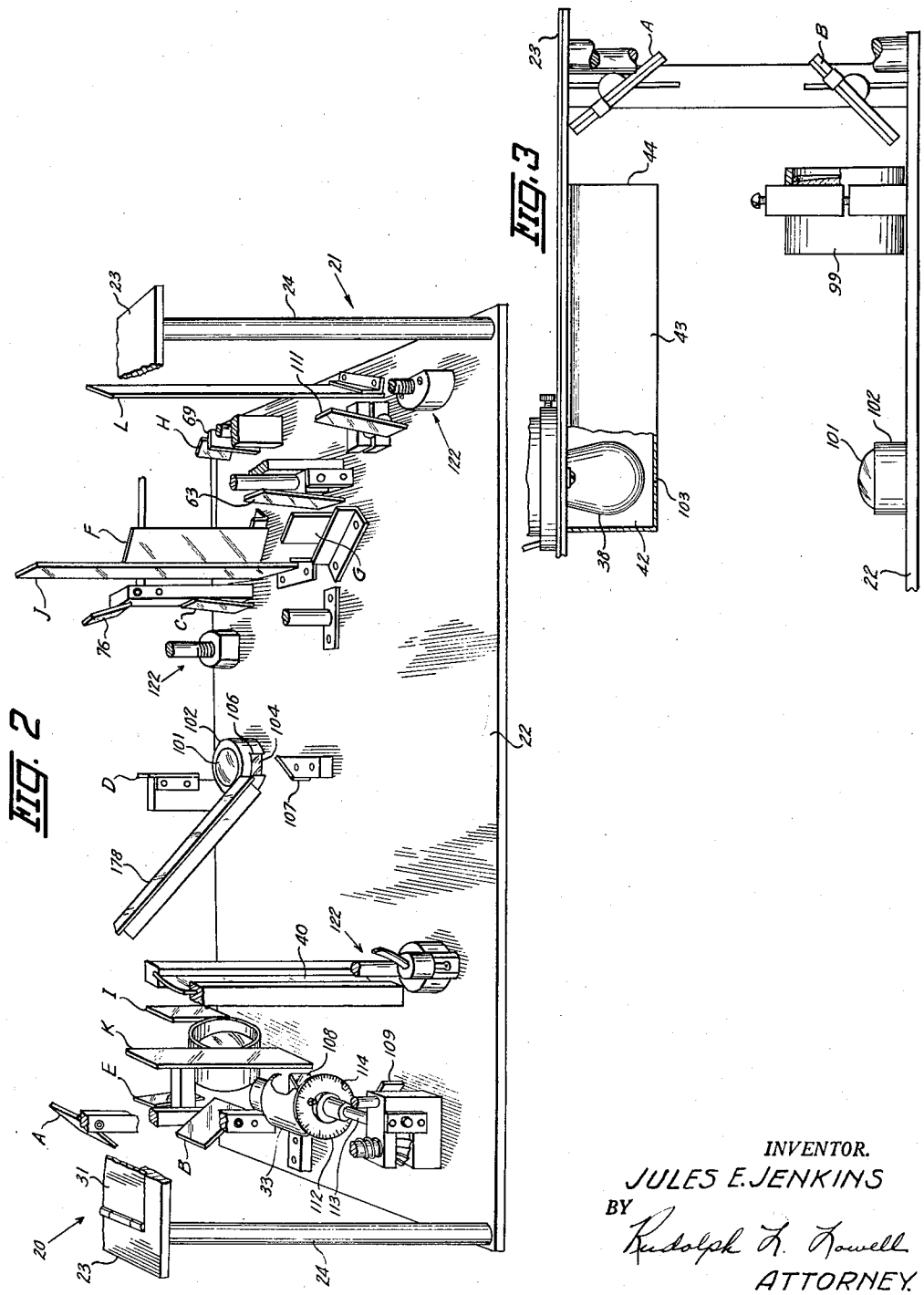

Dec. 22, 1959  J. E. JENKINS  2,917,918
VIBRATION MEASURING AND RECORDING APPARATUS
Filed Oct. 3, 1956  6 Sheets-Sheet 4
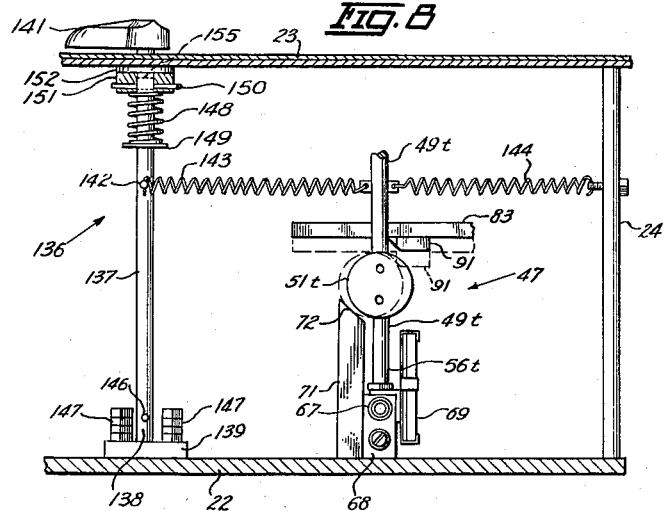
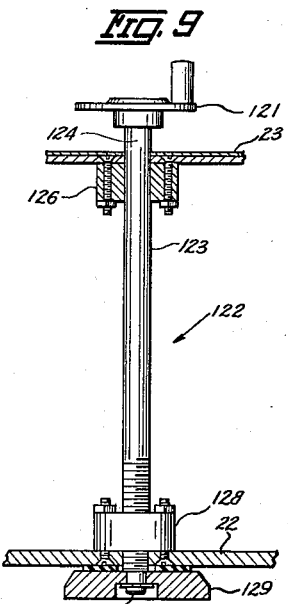
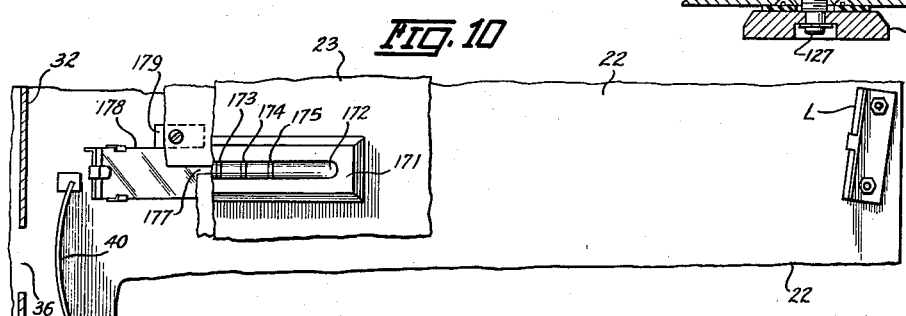
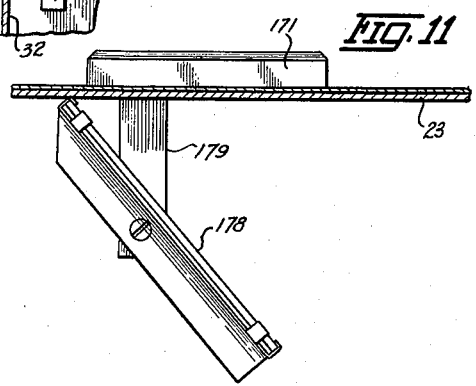
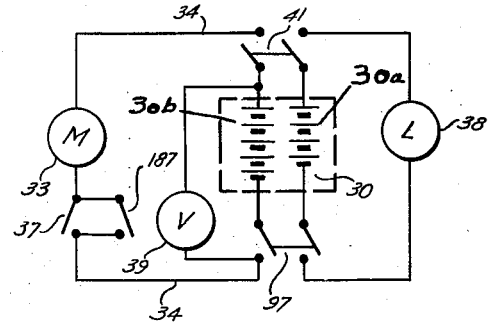
INVENTOR.
JULES E. JENKINS
BY Rudolph L. Lowell
ATTORNEY.

Dec. 22, 1959  J. E. JENKINS  2,917,918
VIBRATION MEASURING AND RECORDING APPARATUS
Filed Oct. 3, 1956  6 Sheets-Sheet 5
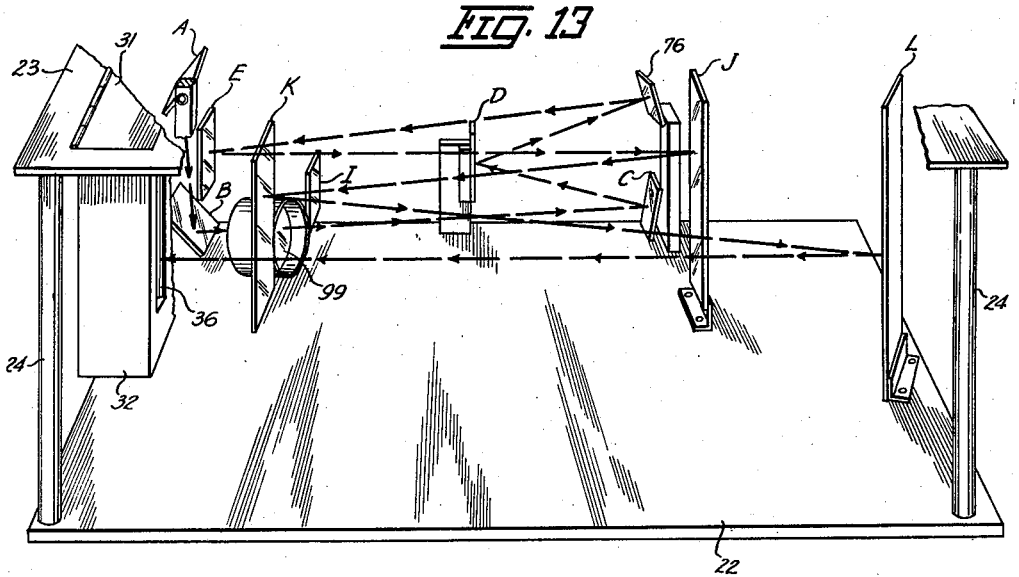
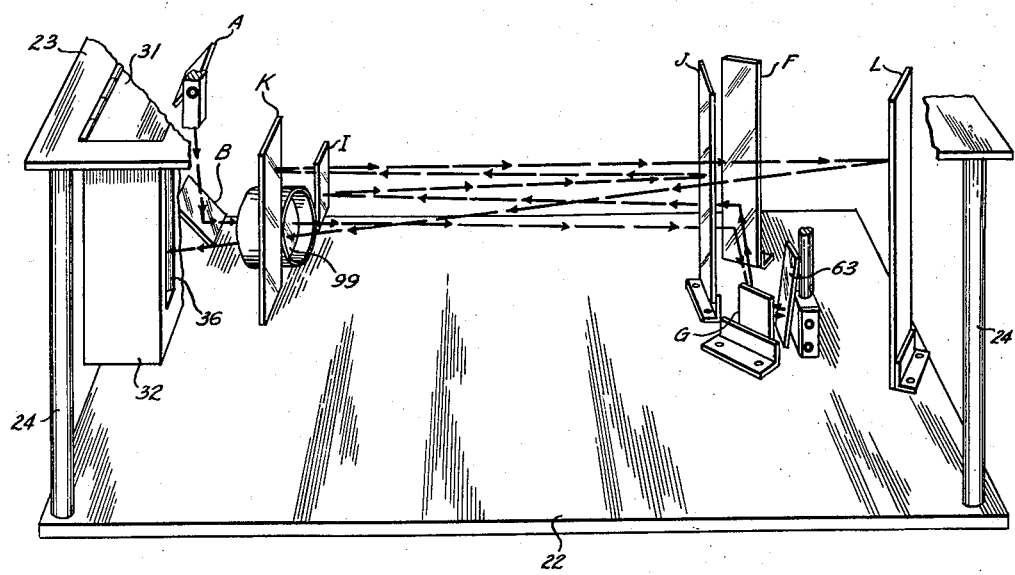
INVENTOR.
JULES E. JENKINS
BY Rudolph L. Lowell
ATTORNEY.

Dec. 22, 1959   J. E. JENKINS   2,917,918
VIBRATION MEASURING AND RECORDING APPARATUS
Filed Oct. 3, 1956   6 Sheets-Sheet 6
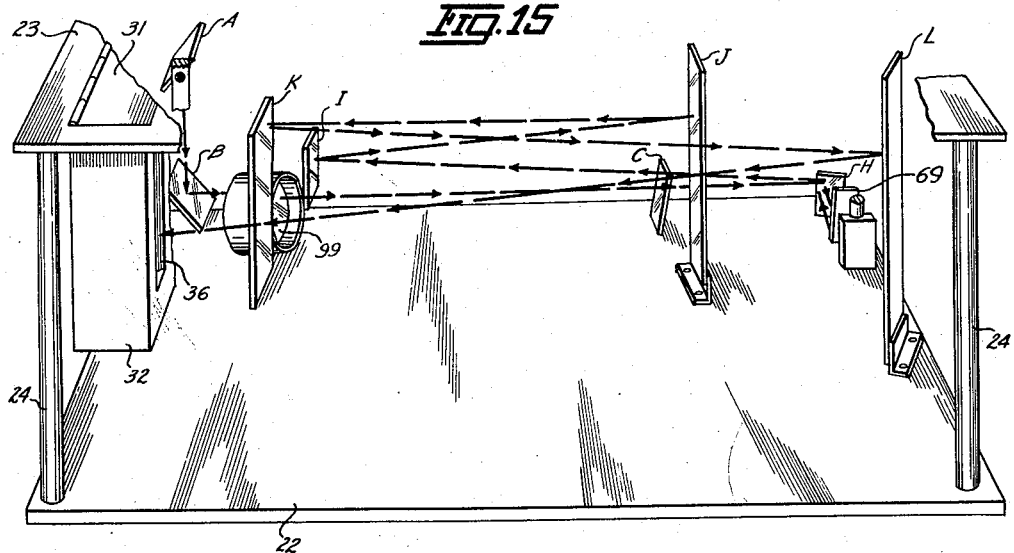
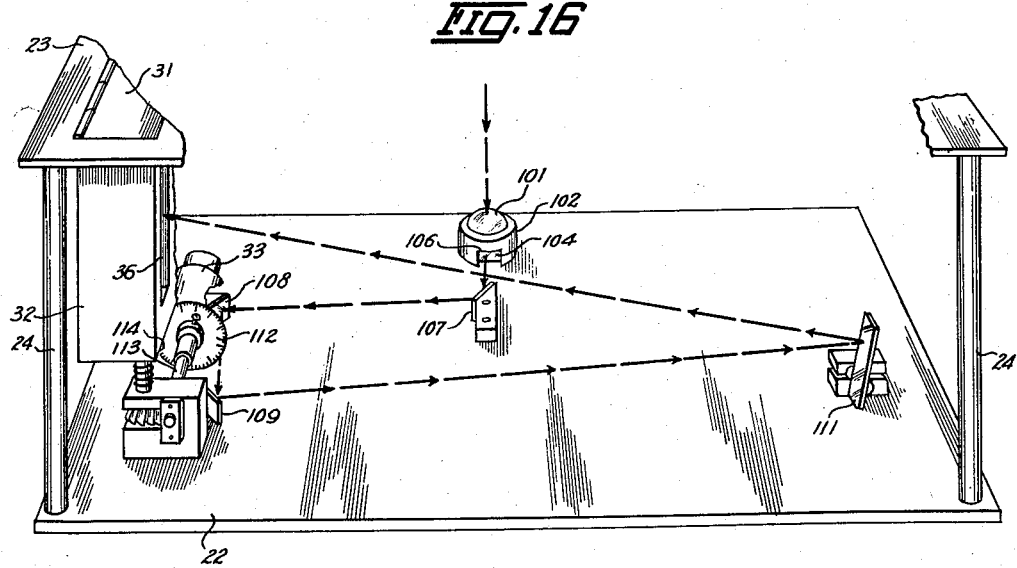
INVENTOR.
JULES E. JENKINS
BY
Rudolph L. Lowell
ATTORNEY.

United States Patent Office 2,917,918
Patented Dec. 22, 1959

2,917,918

VIBRATION MEASURING AND RECORDING APPARATUS

Jules E. Jenkins, Chicago, Ill.

Application October 3, 1956, Serial No. 613,631

4 Claims. (Cl. 73—71.1)

This invention relates generally to recording instruments and more particularly to apparatus for measuring and recording vibrations.

An object of this invention is to provide improved vibration measuring and recording apparatus.

A further object of this invention is to provide apparatus for concurrently measuring and recording vibrations in three mutually perpendicular planes.

Another object of this invention is to provide vibration measuring and recording apparatus which includes three pendulums and a single manually operable means for concurrently locking the pendulums in fixed positions to avoid damage to the pendulums during transport of the apparatus.

A further object of this invention is to provide vibration measuring and recording apparatus which includes three pendulums mounted for vibration in three mutually perpendicular planes and means for directing a light beam from mirrors on the pendulums onto a light sensitive material for permanent recording thereon.

Another object of this invention is to provide vibration measuring and recording apparatus of the above described type which includes a color coded adjusting mechanism for the pendulums for insuring three separate and distinct light patterns in a centered relation on the light sensitive material.

Still another object of this invention is to provide vibration measuring and recording apparatus which is compact in construction, economical to manufacture, readily portable, and efficient in operation in measuring and permanently recording the instant variations of the vibration displacement (amplitude) and a time scale from which the frequency of the vibration can be determined.

Further objects, features and advantages of this invention will become apparent from a consideration of the following description when taken in connection with the accompanying drawing in which:

Fig. 1 is a top plan view of the vibration measuring and recording apparatus of this invention, with a portion of the carrying case cover therefor broken away to show the instrument panel for the apparatus;

Fig. 2 is a fragmentary perspective view of a portion of the apparatus of this invention, showing the base plate and the mirrors carried thereon;

Fig. 3 is a fragmentary side elevational view of a portion of the apparatus of this invention looking substantially along the line 3—3 in Fig. 1, with the carrying case for the apparatus removed;

Fig. 4 is a fragmentary sectional view of a portion of the apparatus of this invention looking substantially along the line 4—4 in Fig. 1, with the carrying case for the apparatus removed;

Fig. 5 is a horizontal sectional view as seen along the line 5—5 in Fig. 4;

Fig. 6 is a vertical sectional view as seen along the line 6—6 in Fig. 5 and showing the pendulum in the apparatus of this invention for measuring vibrations in a vertical plane.

Fig. 7 is a side elevational view looking substantially along the line 7—7 in Fig. 5 and showing the pendulum in the apparatus for measuring vibrations in a plane extended longitudinally of the apparatus;

Fig. 8 is a transverse sectional view as seen substantially along the line 8—8 in Fig. 5 and showing the pendulum in the apparatus for measuring vibrations in a plane extended transversely of the apparatus;

Fig. 9 is a fragmentary vertical sectional view of a portion of the apparatus of this invention showing one of the three leveling devices therefor;

Fig. 10 is a fragmentary top plan view of a portion of the apparatus showing the color coded light receiving member used in centering the pendulums in the apparatus of this invention, with a part of the member being broken away to show the light directing mirror therefor;

Fig. 11 is a fragmentary elevational view of the light receiving member and mirror shown in Fig. 10;

Fig. 12 is a diagrammatic illustration of the electrical circuits in the apparatus of this invention;

Figs. 13, 14 and 15 are partial perspective views of the apparatus of this invention showing the mirrors carried by the vertical, longitudinal and transverse pendulums, respectively, and showing the mirrors for directing light to and transmitting light from such pendulum mirrors, with the light path for each pendulum mirror being shown in dotted lines; and Fig. 16 is a partial perspective view of the apparatus of this invention, illustrated similarly to Figs. 13, 14 and 15, showing the light path for indicating calibrated time periods on the light sensitive material which records the vibrations measured by the apparatus.

With reference to the drawing, the vibration measuring and recording apparatus of this invention, indicated generally at 20, is illustrated in Figs. 1 and 2 as including a frame 21 having a horizontal base plate 22 and a horizontal instrument panel 23 spaced above and supported on the base plate 22 by four upright corner posts 24, only two of which appear in Fig. 2. The frame 21 is removably secured in a carrying case 26 (Fig. 1) having a removable cover 27 and a handle 28 to facilitate transport of the apparatus 20.

Removably supported on the frame 21 at a position below a first hinged cover portion 29 of the instrument panel 23 is a dry cell battery, indicated generally at 30 in Fig. 12, of a particular design, having a six volt section 30a and a seven and one-half volt section 30b. A second hinged portion 31 of the instrument panel 23 covers a housing 32 (Figs. 13–16, inclusive) for a camera device (not shown) driven by a motor 33 connected by leads 34 to the battery section 30b (Fig. 12). The camera device is of well known construction and is, therefore, not described in detail herein. It consists of a pair of reels (not shown), one of which is driven by the motor 33, for moving a strip of light sensitive paper (not shown) across an elongated upright slot 36 in the camera housing 32 (Figs. 13–16). A switch 37 (Figs. 1 and 12) connected in series with the motor 33 and mounted on the instrument panel 23 is operable to start and stop the motor 33 for the camera device only when a switch 41 is also closed. A volt meter 39 connected in series with the motor 33 indicates the charged condition of the battery 30.

Connected to the battery section 30a (Fig. 12) in a circuit separate from the circuit for the motor 33, is a bulb 38 connected in series with the switch 41, both of which are mounted on the panel 23 (Fig. 1). By virtue of the arrangement of the switches 37 and 41, the motor 33 cannot be started until the switch 41 is closed. As a result, the camera device cannot be mistakenly operated without the light 38 being on. The bulb 38 is mounted on the instrument panel 23 and projects downwardly therefrom into end 42 (Fig. 3) of a light box 43 that is closed except at its end 44 which is open for a purpose to appear later.

The pendulums

As thus far described it can be seen that the apparatus 20 includes a source of light, namely, the bulb 38 and a light sensitive material (not shown) mounted for movement past the slot 36 in the camera housing 32. Light from the bulb 38 is directed through the slot 36 onto the sensitive paper to provide three separate light patterns showing vibrations in three planes extended longitudinally, transversely and vertically of the frame 21. The structure for providing these three light patterns includes three pendulum units 46, 47 and 48 (Fig. 4) mounted for swinging movement in mutually perpendicular planes extended longitudinally, transversely, and vertically of the frame 21, respectively.

For the purpose of clarity, the component parts of the units 46, 47 and 48, which are substantially alike, are designated by like numerals having the letter suffixes "L," "t," and "v," respectively, corresponding to the planes of vibration of the units. Each of the units 46, 47 and 48 consists of an elongated rod 49 (Figs. 4 to 8) provided intermediate its ends with a transversely extended cylindrically shaped weight 51. At one end 52 (Figs. 4 and 5) the rod 49 carries a thin metal plate 53 positioned between and in a spaced relation with a pair of permanent magnets 54 carried by the frame 21. At its opposite end 56, each rod 49 is pivotally supported for rotation in a plane extended between the corresponding pair of magnets 54 which exert a dampening force on the plate 53 and the supporting rod 49 therefor. Each rod 49 preferably consists of two separate pieces which abut at approximately the center of the cylindrically shaped weight 51 therefor. This arrangement permits adjustment of the corresponding plate 53 to a desired spaced relation with the magnets 54 without disturbing the position of the weight 51.

The lower end 56L (Fig. 7) of rod 49L for the unit 46 is supported on a ball bearing pivot 61 carried on a block 62 secured to the base plate 22. The pivot 61 extends transversely of the frame 21 to provide for rotation of the rod 49L in a plane extended longitudinally of the frame 21. Adjacent its lower end 56L the rod 49L carries an upright mirror 63. Secured to the base 22 at a position adjacent one side of the block 62 is an upwardly extended stop bar 64 having an inclined upper end 66 which faces the cylindrical weight 51L for the pendulum unit 46 and is positioned to one side of the weight 51L for a purpose to appear later.

Likewise, the lower end 56t (Fig. 8) of the rod 49t for the unit 47 is supported on a ball bearing pivot 67 carried on a block 68 secured to the base plate 22. The pivot 67 extends longitudinallly of the frame 21 to provide for rotation of the rod 49t in a plane extended transversely of the frame 21. An upright mirror 69 is rigidly secured to the rod 49t adjacent its lower end 56 for swinging movement therewith. Secured to the base 22 at a position adjacent one side of the block 68 is an upwardly extended stop bar 71 having an inclined upper end 72 which faces the weight 51t for the unit 47 and is positioned to one side of the weight 51t for a purpose to appear later.

Similarly, the end 56v of the rod 49v for the unit 48 (Fig. 6) is supported on a horizontal pin or pivot 73 carried on a block 74 secured to the base plate 22. The rod 49v and the weight 51v carried thereby are thus rotatable about the pivot 73 in a vertical plane. A mirror 76 is carried by the terminal end of the rod 49v for rotation with the rod 49. Secured to the base 22 at a position directly below the cylindrical weight 51v is an upwardly extended stop bar 77 for a purpose to appear later.

The pendulum locking structure

During transport of the apparatus 20, the pendulum units 46, 47 and 48 must be held against swinging movement to avoid damage to the units. As best appears in Fig. 5, the units 46, 47, and 48 are arranged in one corner of the frame 21. Positioned generally between the cylindrical weights 51L, t and v for the units is an upright shaft 78 (Figs. 4 and 5) supported at its lower end in a bearing 79 carried by the base 22. The shaft 78 extends upwardly through and is threadably supported in a block 81 carried by the instrument panel 23. At its upper end, the shaft 78 carries a knob 82 which, on rotation, is operable to raise or lower the shaft 78 relative to the instrument panel 23.

Intermediate its ends, the shaft 78 extends through a horizontal plate 83 (Figs. 4–8, inclusive) which has a depending bearing block 84 rotatably received on the shaft 78. A pair of retaining members 86 secured to the shaft 78 on opposite sides of the plate 83 and the block 84 provide for up and down movement of the plate 83 with the shaft 78 while permitting rotation of the shaft 78 within the plate 83. To positively prevent any rotation of the plate 83 on the shaft 78, the plate 83 is loosely received on an upright rod 87 (Figs. 4 and 5) extended between the base 22 and the instrument panel 23 at a position to one side of the shaft 78. A stop ring 88 on the rod 87 is engageable with the top side of the plate 83 to limit upward movement thereof.

The plate 83 carries a pair of extension members 89 and 91 positioned to one side of the centers of and above the cylindrical weights 51L and t, respectively. As best appears in Fig. 7, on downward movement of the plate 83, in response to a rotation in one direction of the knob 82, the extension 89 is moved downwardly to a position in engagement with one side of the weight 51L for the unit 46. On continued downward movement of the plate 83, the weight 51L is moved to a position clamped between the extension 89 and the inclined end 66 of the stop bar 64. Likewise, on such downward movement of the plate 83, the extension 91 (Fig. 8) is moved downwardly to a position engaging one side of the cylindrical weight 51t for the unit 47 to thereby clamp the weight 51t between the extension 91 and the inclined end 72 of the stop bar 71.

As shown in Fig. 6, one end 92 of the plate 83 is positioned directly above the cylindrical weight 51v for the pendulum unit 48. Thus on downward movement of the plate 83 to the clamping positions of the extensions 89 and 91 therefor (Figs. 7 and 8), the end 92 of the plate 83 is in an engaged position with the weight 51v between the plate 83 and the upper end of the corresponding stop bar 77.

It is seen, therefore, that the plate 83 is movable downwardly to a position clamping the pendulum units 46, 47 and 48 in fixed positions. Likewise, the plate 83 is movable upwardly to a position in which the plate 83 and the extensions 89 and 91 therefor are in a clearance relation with the units 46, 47 and 48 so as not to interfere with swinging or vibrating movements thereof as will more clearly appear hereinafter. In this connection, and as best appears in Fig. 5, the extensions 89 and 91 are provided with reduced end sections 93 so as not to interfere with the swinging movements of the rods 49L and t.

In an upper position (Fig. 4), the plate 83 acts to move a yieldable switch actuating arm 96 into a closing position for a switch unit 97. On downward movement of the plate 83, the arm 96 automatically moves to a switch open position. The switch 97 (Fig. 12) is of two-way type for concurrently opening and closing the circuits corresponding to the battery sections 30a and 30b. Thus during transport of the apparatus 20, the battery circuits are automatically opened by the switch 97 when the pendulum units are locked. The provision of the switch unit 97 thereby prevents an inadvertent waste of current from the battery 30, even if the switch 41 is inadvertently left closed.

The mirror system

As hereinbefore mentioned, light from the bulb 38 is directed against the pendulum mirrors 63, 69 and 76 and thence through the slot 36 in the camera housing 32. This is accomplished by a series of mirrors A-L, inclusive (Fig. 2) rigidly supported on the frame 21 and an upright lens 40 carried on the base 22.

As illustrated in Fig. 3, light from the bulb 38 is directed out of the open end 44 of the light box 43 against an inclined mirror A which in turn directs the light downwardly against an inclined mirror B. Positioned adjacent the mirror B and mounted on the base 22 is a lens member 99 which is arranged relative to the inclined mirror B so that light from the mirror B is directed through the lens 99.

In Fig. 13, the light path to and from the mirror 76 for the pendulum unit 48 is illustrated in dotted lines. As shown therein, light from the lens 99 is directed against a mirror C which directs the light against a mirror D which in turn directs the light against the pendulum mirror 76. From the pendulum mirror 76, the light travels successively against the mirrors E, J, K and L, with the mirror L being arranged to direct the light into the slot 36 so that the vibration pattern of the mirror 76 is recorded on the light sensitive paper (not shown) which is continuously moving past the slot 36.

In Fig. 14 the dotted lines indicate the path of the light traveling to and from the mirror 63 for the pendulum unit 46. Light from the lens 99 is directed against the mirror F which in turn directs the light against the mirror G which is arranged to direct the light against the pendulum mirror 63. From the mirror 63, the light travels successively against the following mirrors: G, F, I, J, K, and L, with the mirror L directing the light through the slot 36 for recording the vibration pattern of the mirror 63 on the light sensitive recording paper traveling past the slot 36.

In Fig. 15, the path of travel of light traveling to and from the mirror 69 for the pendulum unit 47 is illustrated in dotted lines. From the lens 99, the light is directed against the mirror H which in turn directs the light against the pendulum mirror 69. From the mirror 69, the light is directed successively through the mirrors H, I, J, K and L, which as hereinbefore described directs the light through the slot 36 in the housing 32.

It is seen, therefore, that the mirrors A-L, inclusive, are mounted on the frame 21 to utilize light from the lens 99 to record the vibration patterns of the pendulum units 46, 47 and 48, which vibrate in three mutually perpendicular planes, on the light sensitive paper in the camera housing 32. As a result, three separate vibration patterns are recorded on the paper since the light beams corresponding to the units 46, 47 and 48 strike vertically spaced portions of the mirror L and are, therefore, directed against vertically spaced parts of the paper.

The lens 40 is mounted directly in front of the slot 36 so as to concentrate all light directed toward the slot 36 on the light sensitive paper in the housing 32 and provide distinct vibration patterns on the paper. These patterns, when analyzed in a well known manner, can be used to determine the vibrations in the material on which the frame 21 is supported during the vibration recording period.

Frequency recorder

As best appears in Fig. 3, a lens 101 is mounted on the top side of a housing 102 located directly below an opening 103 in the light box 43. Light from the bulb 38 is thus directed through the opening 103 against the lens 101 which concentrates the light on an inclined mirror 104 (Fig. 16) arranged in the housing 102 opposite an opening 106 therein. Light from the mirror 104 is directed through the opening 106 against an inclined upright mirror 107 mounted on the base 22. The mirror 107 directs the light against a second upright inclined mirror 108 arranged at one end of the base 22 below the motor 33. Light from the mirror 108 is directed against another mirror 109 at the same end of the base 22. The mirror 109 in turn directs the light against an upright mirror 111 (Fig. 6) at the opposite end of the base 22, with the mirror 111 being arranged for directing the light into the camera housing opening 36.

Positioned in the path of light from the mirror 108 directed toward the mirror 109 is a disc 112 secured to the drive shaft 113 for the motor 33. The disc 112 is formed at its periphery with radially extended evenly spaced slots 114. The shaft 113 rotates at a constant speed so that the slots 114 are reproduced on the light sensitive paper to thus divide the paper into equal time periods. A speed governor (not shown) which is an integral part of the motor 33 provides for such constant speed rotation of the shaft 113 so long as the volt meter 39 indicates that the battery 30 does not require replacement. As a result, the vibration patterns produced on the paper are not only indicative of the magnitude of the vibrations but when compared with the calibrations on the paper indicate the frequency of the vibrations. Further, certain of the slots 114 are enlarged according to a predetermined coding corresponding to the serial number of the instrument. As a result, a vibration record is permanently identified with a certain instrument.

The color coded light pattern centering structure

As shown in Fig. 1, the frame 21 is provided with three rotatable handle members 121 which correspond to and are parts of three identical leveling devices 122, one of which is illustrated in Fig. 9. Each leveling device 122 consists of an upright elongated shaft 123 secured to and extended downwardly from a handle member 121. Adjacent its upper end 124, the shaft 123 is journaled in a bearing block 126 secured to and depending from the instrument panel 23. At its lower end 127, the shaft 123 is threadably supported in and projected downwardly through a block 128 carried by the frame base 22. A supporting shoe 129, removably received on the lower end 127 of the shaft 123, is arranged below the base 22.

By rotating a handle member 121, the frame 21 is raised or lowered relative to the shaft 123 for the corresponding leveling device 122. As a result, by selectively manipulating the handle members 121 until a bubble 131 in a circular level 132 on the instrument panel 23 is in the center of the level 132, the frame 21 is readily leveled.

Once the frame 21 has been leveled, the pendulum devices 46, 47 and 48 are adjusted relative to the light sensitive paper (not shown) traveling past the slot 36 to provide for the centering of three separate and distinct light patterns on the light sensitive paper. In other words, if the pendulum mirrors 63, 69 and 76 are not centered relative to the light sensitive paper, there is some danger of the light patterns extending off the paper or overlapping in such a manner as to make separation difficult.

Accordingly, the pendulum unit 47 is provided with a centering structure indicated generally at 136 in Fig. 8. The structure 136 includes an upright shaft 137 rotatably supported at its lower end 138 in a block 139 on the base 22. At its upper end, the shaft 137 projects through the instrument panel 23 and carries a handle 141 positioned above the instrument panel 23.

Intermediate its ends, the shaft 137 is connected by a pin 142 to one end of a loosely coiled spring 143 the opposite end of which is connected to the rod 49t for the pendulum unit 47. A second spring 144 extends between the rod 49t and one of the corner posts 24, with the springs 143 and 144 extending in opposite directions from the rod 49t so as to exert oppositely directed forces thereon. The springs 143 and 144 maintain the rod 49t in a rest position for rotation in opposite directions therefrom.

To adjust the position of the mirror 69 for the pendulum unit 47, the handle 141 (Figs. 1 and 8) is rotatable in opposite directions to either stretch or relax the spring 143. On rotation of the handle 141 in a direction to stretch the spring 143 the rod 49t is moved toward the shaft 137. On rotation of the handle 141 in an opposite direction, the spring 144 acts to move the rod 49t in a direction away from the shaft 137. A pin 146 carried by the shaft 137 adjacent the lower end 138 thereof, is engageable with a pair of upright stops 147 extended upwardly from the block 139 to limit rotation of the shaft 137 in either direction to positions in which the spring 143 is only stretched between predetermined limits. Thus, undue stretching of the spring 143 is automatically prevented without manual inspection which is difficult during use of the apparatus since the spring 143 is below the instrument panel 23.

A spring 148 on the shaft 137 extends between an abutment disc 149 and a washer 151 on the shaft 137. A cotter key 150 extends diametrically through the washer 151 and a vertically enlarged opening 155 through the shaft 137 to provide for rotation of the washer 151 with the shaft 137. The opening 155 is vertically enlarged to provide for limited movement of the washer 151 longitudinally of the shaft 137. The spring 148 maintains the washer 151 in frictional engagement with a rubber washer 152 loosely received on the shaft 137 and positioned in frictional engagement with the underside of the instrument panel 23. The spring 148 thus cooperates with the washers 151 and 152 to maintain the shaft 137 in a rotated position against the slight counteracting force of the springs 143 and 144.

The pendulum unit 46 is provided with a centering device, having a handle 153 (Fig. 1), which is identical with the device 136 and is, therefore, not illustrated.

Likewise, the pendulum unit 48 is provided with a similar centering device having a handle 154 (Fig. 1). In Fig. 6 a portion of the centering device for the pendulum unit 48 is illustrated as including an upright rod 161 secured to the pivoted rod 49v and provided with a pair of springs 162 and 163 extended in opposite directions therefrom. The spring 162 is connected to a shaft (not shown), like the shaft 137 for the device 136, provided with the handle 154. The spring 163 is connected to one of the corner posts 24 for the frame 21 and cooperates with the spring 162 to provide a rest position for the rod 49v.

Each of the handles 141, 153 and 154 is provided with a colored portion 166 which in one embodiment of the invention are blue, red and white, respectively.

Mounted on the instrument panel 23 at a position adjacent the volt meter 39 is an upwardly extended rectangular housing 171 (Figs. 1, 10 and 11) for an elongated light receiving member 172 formed of glass or the like. The member 172 is likewise provided with red, white and blue colored portions 173, 174 and 175, respectively.

As best appears in Figs. 10 and 11, the light receiving member 172 is mounted directly above a slot 177 in the instrument panel 23 which is in turn directly above an inclined elongated mirror 178 suspended by a means of a strap 179 from the instrument panel 23. The mirror 178 is in a position intermediate the mirror L and the camera housing slot 36. As a result, the mirror 178 intercepts and deflects a portion of the three beams of light (Figs. 13, 14 and 15) directed toward the slot 36 by the mirror L. In other words, the mirror 178 projects only partially into the paths of the above mentioned three beams of light so as not to interfere with the production of the light patterns on the light sensitive paper in the housing 32.

The mirror 178 is arranged in a predetermined relation with the light receiving member 172 and the pendulum mirrors 63, 69 and 76 such that when a centering device handle 141, 153 or 154 has been adjusted to a position in which a light beam is directed against the correspondingly colored portion 173, 174 or 175 of the light receiving member 172, the corresponding mirror 63, 69 or 76 is in the desired centered relation relative to the slot 36.

Operation

In use the apparatus 20 is placed at a location where it is desired to measure vibrations. The cover 27 is removed and the handles 121 are selectively manipulated until the bubble 131 is centered to thus level of the frame 21. The light switch 41 is moved to an "on" position and the handle 82 is moved in an "unlocking" direction to a stop position in which the switch unit 97 is closed and the pendulum units 46, 47 and 48 are released.

On separate manipulation of the handles 141, 153 and 154 the units 47, 46 and 48 are adjusted to centered positions in which separate light reflections are visible on the blue, red and white portions 175, 173 and 174, respectively, of the light receiving member 172. On closing of the camera switch 37 the apparatus 20 operates immediately to record vibration in the three mutually perpendicular planes in which the pendulum units 46, 47 and 48 operate, unless remote on and off operation of the apparatus 20 is required. In such event, a wire assembly (not shown) of well known construction, and having a switch 187 (Fig. 12) is inserted in a socket 186 in the instrument panel 23. The switch 187 (Fig. 12) is then movable between open and closed positions from a remote location.

During prolonged operation of the apparatus 20, in the event the battery 30 runs down, this condition is apparent from a low reading on the volt meter 39. Visual observation of such a low reading is preferably facilitated by coloring a low portion of the volt meter dial. When such a low reading is observed, the battery is replaced.

From the above description, it is seen that this invention provides a portable vibration measuring and recording apparatus 20 which may be quickly set up at a desired location to concurrently measure vibrations in three mutually perpendicular planes. By merely rotating the knob 82 in a "locking" direction (Fig. 1) the pendulum units 46, 47 and 48 are securely clamped in fixed positions during transport to avoid any damage to the units. When it is desired to operate the apparatus 20, it is only necessary to rotate the knob 82 in an opposite direction and to manipulate the pendulum adjusting handles 141, 153 and 154 while observing the color coded member 172. Three distinct patterns, corresponding to the pendulum units 46, 47 and 48, on the light sensitive paper in the housing 32 is then assured. It is to be understood that for the purpose of clarity the apparatus 20 has been described with respect to vibration of the pendulum units 46, 47 and 48. However, it is apparent that during operation of the apparatus 20, the units 46, and 47 and 48 actually stand still in space while the rest of the apparatus 20 vibrates.

Although the invention has been described with respect to a preferred embodiment thereof, it is to be understood that it is not to be so limited, since changes can be made therein which are within the scope of the appended claims.

I claim:
1. In a vibration measuring and recording apparatus which includes a frame, pendulums mounted on said frame for vibration in mutually perpendicular planes, mirrors corresponding to and mounted on said pendulums for vibration therewith, light pattern recording means mounted on said frame, and means for directing light against said pendulum mirrors and thence onto said recording means; adjusting means on said frame for separately moving said pendulums to adjusted positions, identifying means associated with each of said adjusting means, light receiving means mounted on said frame and provided with identified portions corresponding to the identifying means associated with said adjusting means, mirror means on said frame for directing a portion of the light directed toward said recording means onto said light receiving means, said light receiving means, recording means and pendulum mirrors being arranged in a predetermined relation to provide for the forming of separate spaced light patterns arranged in a predetermined order on said recording means when each of said adjusting means is adjusted to provide for the direction of light against the correspondingly identified portion of said light receiving means.

2. Vibration measuring and recording apparatus comprising a frame having an instrument panel, three pendulums mounted on said frame for swinging movement in opposite directions from rest positions in three mutually perpendicular planes, a mirror carried on each of said pendulums for movement therewith, a single light source on said frame, a plurality of first mirrors mounted in fixed predetermined positions on said frame for directing light from said source onto the mirrors carried by said pendulums, light pattern recording means mounted on said frame, means on said instrument panel for adjusting the rest positions of said pendulums, a plurality of second mirrors mounted in fixed predetermined positions on said frame for directing light from said pendulum mirrors onto said recording means and means mounted on said instrument panel for receiving a portion of the light reflected from each pendulum mirror, said light receiving means having distinguishable portions thereon identifiable with the light reflected from each pendulum mirror, with said portions of light reflected from each pendulum mirror being directed to a corresponding distinguishable portion of said light receiving means by adjustment of said pendulum adjusting means, whereby the light reflected from each pendulum mirror is centered in a predetermined position on said recording means.

3. In vibration measuring and recording apparatus which includes a frame having an instrument panel, pendulums mounted on said frame for vibration in opposite directions from rest positions in mutually perpendicular planes, mirrors corresponding to and mounted on said pendulums for vibration therewith, light pattern recording means mounted on said frame, and light reflecting means mounted in fixed positions on said frame for directing light against said pendulum mirrors for reflection therefrom onto said recording means; separate means on said frame for separately moving said pendulums to adjusted rest positions, each separate adjusting means having an element on said panel which is marked with a distinctive color, a member mounted on said panel which is transparent to said reflected light and provided with spaced portions thereon within the path of said reflected light, said portions each marked with a color corresponding to a respective adjustment means color, mirror means mounted on said frame at a position opposite said transparent member for directing a portion of the light directed toward said recording means onto said transparent member, with said transparent member, recording means and pendulum mirrors being arranged in a predetermined relation to provide for the forming of separate spaced light patterns arranged in a predetermined order on said recording means when each of said adjusting means is adjusted to provide for the direction of light against the corresponding color marked portion of said light receiving member.

4. In vibration measuring and recording apparatus which includes a substantially rectangular frame and three pendulum units mounted on said frame for rotational movement in planes extended longitudinally, laterally and transversely of said frame, with each of said units including a pivotally supported rod and a cylindrical weight secured thereto, a plate member mounted on said frame for translatory movement in one direction toward said weights to a position in engagement with one side of the weight for said laterally movable pendulum, extension means on said plate engageable with one side of said weights for the transversely and longitudinally movable pendulums concurrently with engagement of said plate with said laterally movable weight, stop means on said frame corresponding to said pendulums and arranged on the opposite sides thereof, with said plate member being movable further in said one direction for moving said weights into engagement with said stop means to clamp said weights between said plate and the extension means therefor and said stop means.

References Cited in the file of this patent

UNITED STATES PATENTS

| | | |
|---|---|---|
| 1,727,991 | Kimball et al. | Sept. 10, 1929 |
| 1,789,055 | Taylor | Jan. 13, 1931 |
| 1,869,828 | Shrader | Aug. 2, 1932 |
| 2,063,790 | Carbonara | Dec. 8, 1936 |
| 2,262,165 | Clewell | Nov. 11, 1941 |
| 2,293,288 | Gadd | Aug. 18, 1942 |
| 2,536,870 | Burmist | Jan. 2, 1951 |
| 2,626,525 | Heiland | Jan. 27, 1953 |